(12) United States Patent
Ishikawa et al.

(10) Patent No.: US 7,412,913 B2
(45) Date of Patent: Aug. 19, 2008

(54) APPARATUS FOR DRIVING AN OIL PUMP FOR AUTOMATIC TRANSMISSION

(75) Inventors: Masanori Ishikawa, Shizuoka (JP); Yuji Takahashi, Kanagawa (JP); Hiromu Soya, Kanagawa (JP)

(73) Assignee: JATCO Ltd, Shizuoka (JP)

( * ) Notice: Subject to any disclaimer, the term of this patent is extended or adjusted under 35 U.S.C. 154(b) by 652 days.

(21) Appl. No.: 11/124,392

(22) Filed: May 9, 2005

(65) Prior Publication Data
US 2005/0255954 A1    Nov. 17, 2005

(30) Foreign Application Priority Data
May 17, 2004    (JP)    ............... 2004-146827

(51) Int. Cl.
*F16H 47/02*    (2006.01)
(52) U.S. Cl. .................................... 74/732.1; 74/733.1
(58) Field of Classification Search ........... 74/730.1, 74/732.1, 733.1
See application file for complete search history.

(56) References Cited

U.S. PATENT DOCUMENTS

| 3,491,621 | A | * | 1/1970 | Moan ........................... 475/66 |
| 4,010,660 | A |   | 3/1977 | Ahlen |
| 4,011,775 | A |   | 3/1977 | Ahlen |
| 5,314,616 | A | * | 5/1994 | Smith ........................... 210/130 |
| 5,662,198 | A | * | 9/1997 | Kojima et al. ............. 192/87.11 |
| 6,925,798 | B2 | * | 8/2005 | Hori et al. ..................... 60/336 |
| 6,988,831 | B2 | * | 1/2006 | Nakamura et al. ........... 384/513 |

FOREIGN PATENT DOCUMENTS

| CH | 607 784 | 10/1978 |
| JP | 04-337151 A | 11/1992 |
| JP | 2003-156130 A | 5/2003 |

\* cited by examiner

*Primary Examiner*—Ha D. Ho
(74) *Attorney, Agent, or Firm*—Foley & Lardner LLP

(57) ABSTRACT

An oil pump driving apparatus including a rotation shaft in driving connection with a torque converter, a drive sprocket rotatable about the rotation shaft and adapted to be connected with a driven sprocket disposed on the oil pump via the chain, a first sleeve disposed on a radial outside of the rotation shaft so as to be rotatable together with the torque converter, the first sleeve being engaged with the drive sprocket, a second sleeve fixedly disposed on a radial inside of the first sleeve, a first bearing supporting the first sleeve so as to be rotatable relative to the second sleeve, and a second bearing supporting the drive sprocket so as to be rotatable relative to the second sleeve.

10 Claims, 3 Drawing Sheets

APPARATUS FOR DRIVING AN OIL PUMP FOR AUTOMATIC TRANSMISSION

BACKGROUND OF THE INVENTION

The present invention relates to an apparatus for driving an oil pump arranged in a radially spaced relation to an input shaft of an automatic transmission.

Japanese Patent Application First Publication No. 2003-156130 describes an oil pump driving arrangement. In this document, a drive sprocket is disposed on an outer periphery of a torque converter sleeve, and a driven sprocket is disposed on an oil pump. The drive sprocket and the driven sprocket are connected with each other via a chain, so that the oil pump is driven by a driving force transmitted from an engine thereto via the chain. In the conventional arrangement, the torque converter sleeve is disposed so as to allow a slight displacement thereof in the axial direction because a converter cover is expanded due to the temperature rise or pressure of an oil within the torque converter. Therefore, the torque converter sleeve is engaged with the drive sprocket so as to be slightly axially moveable relative thereto.

SUMMARY OF THE INVENTION

Generally, a converter cover of the torque converter has an upstream end portion disposed on an axial end side of an engine crankshaft and rotatably supported on a support portion of the engine crankshaft. Rotation of the engine is directly transmitted to the converter cover without through a damper or oil. Therefore, the converter cover tends to suffer from vibration that is caused in the engine crankshaft or engine drive plate in the rotation direction or the direction offset from the rotation axis and transmitted to the converter cover. Further, the torque converter sleeve is located on a downstream side of the converter cover. The torque converter sleeve is rotatably supported on a stator shaft with a radial clearance via a bushing press-fitted therebetween.

In the arrangement of the related art as described above, the torque converter sleeve tends to undergo backlash due to the vibration caused in a direction offset from the rotation axis. The backlash is directly input from the torque converter sleeve to the drive sprocket supported on the torque converter sleeve. This will cause abrasion and noise at the mutually engaged portions of the torque converter sleeve and the drive sprocket. In order to ensure strength and durability of the mutually engaged portions of the torque converter sleeve and the drive sprocket, it is required to ensure a thickness of the mutually engaged portions or subject the mutually engaged portions to a surface hardening treatment. This will deteriorate the cost-performance.

The present invention has been made to solve the problems of the conventional art. An object of the present invention is to provide an oil pump driving apparatus capable of improving the durability and preventing the occurrence of noise.

In one aspect of the present invention, there is provided an apparatus for driving an oil pump connected with a torque converter, the apparatus comprising:

a rotation shaft in driving connection with the torque converter;
  a drive sprocket rotatable about the rotation shaft and adapted to be connected with a driven sprocket disposed on the oil pump via the chain;
  a first sleeve disposed on a radial outside of the rotation shaft so as to be rotatable together with the torque converter, the first sleeve being engaged with the drive sprocket;
  a second sleeve fixedly disposed on a radial inside of the first sleeve;
  a first bearing supporting the first sleeve so as to be rotatable relative to the second sleeve; and
  a second bearing supporting the drive sprocket so as to be rotatable relative to the second sleeve.

DETAILED DESCRIPTION OF THE INVENTION

Figure 1:
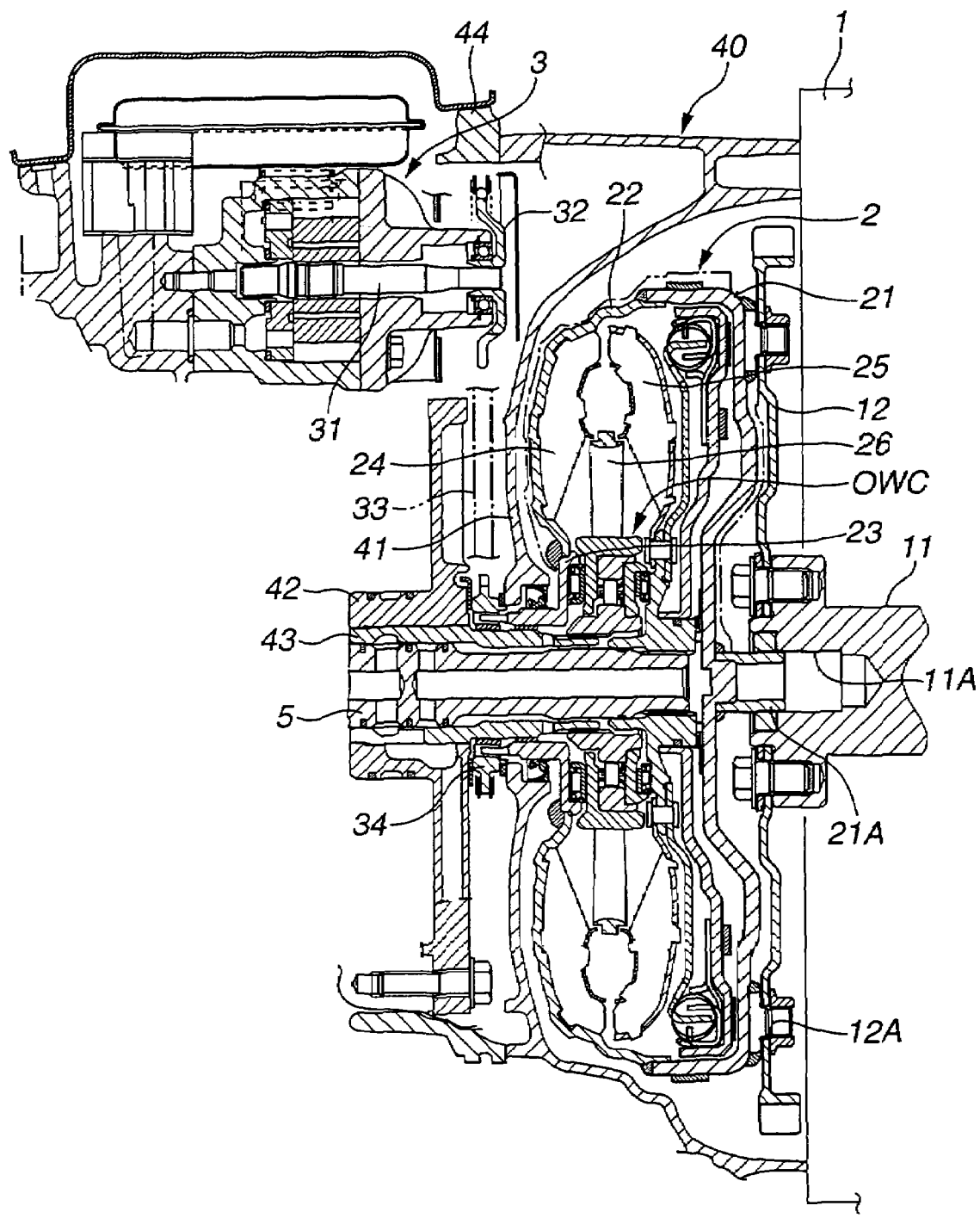
FIG. 1 is a partial section of a torque converter of an automatic transmission, to which an oil pump driving apparatus of an embodiment of the present invention is incorporated.

In the followings, an embodiment of the present invention will be described with reference to the accompanying drawings. FIG. 1 illustrates a torque converter and the periphery thereof, of an automatic transmission, to which an oil pump driving apparatus according to the embodiment of the present invention is incorporated. As illustrated in FIG. 1, transmission unit housing 40 is mounted to engine 1. Transmission unit housing 40 includes torque converter housing 41, cover 42, stator shaft 43 and oil pump housing 44. Torque converter housing 41 accommodates torque converter 2. Cover 42 and stator shaft 43 support input shaft 5 and torque converter 2. Cover 42 is made of a suitable light weight material such as aluminum, serving for reducing a weight thereof. Stator shaft 43 is fixed to transmission unit housing 40. Stator shaft 43 is in the form of a sleeve receiving input shaft 5. Stator shaft 43 is made of an iron-based material and has a sufficient strength as a support. Oil pump housing 44 accommodates oil pump 3. In this embodiment, oil pump 3 is arranged spaced from input shaft 5 in a radial direction of input shaft 5.

Engine drive plate 12 is connected to engine crankshaft 11 that outputs a driving force of engine 1, by means of bolts 12. Engine drive plate 12 has connecting portion 12A on a radially outside thereof, which is connected with converter cover 21 of torque converter 2. Converter cover 21 has pilot boss 21A on one axial side face thereof which is opposed to engine 1. Pilot boss 21A is disposed at a radially central portion of the one axial end face of converter cover 21 and fitted into bearing bore 11A formed at a central portion of engine crankshaft 11. Thus, torque converter 2 is centered relative to engine crankshaft 11 and supported thereon. Impeller shell 22 of torque converter 2 is welded to the other axial end face of converter cover 21 which is oriented toward torque converter housing 41.

Pump impeller 24, turbine runner 25 and stator 26 are disposed within impeller shell 22. Pump impeller 24 is located on a side opposite to engine 1, namely, on a side of a transmission mechanism, not shown. Turbine runner 25 is located on a side of engine 1. One-way clutch OWC that is fixed to stator shaft 43, is disposed on an inner circumferential periphery of stator 26. Torque converter sleeve 23 is connected with an radial-inner periphery of impeller shell 22 by welding. Sprocket 34 acting as a drive sprocket is engaged with torque converter sleeve 23 and disposed on an axial outside of torque converter housing 41 which is on the side opposite to engine 1. Sprocket 34 is connected with sprocket 32 as a driven sprocket which is mounted to drive shaft 31 of oil pump 3, via chain 33.

When engine 1 is driven, engine crankshaft 11, engine drive plate 12, converter cover 21, impeller shell 22 and torque converter sleeve 23 are brought into a unitary rotation. The rotation is transmitted to input shaft 5 via stator 26 and turbine runner 25, by an oil filled in torque converter 2. Sprocket 34 engaged with torque converter sleeve 23 transmits the rotation, namely, the driving force of engine 1 to sprocket 32 via chain 33. The driving force of engine 1 is then transmitted to drive shaft 31 of oil pump 3 through sprocket 32 to thereby drive oil pump 3. Meanwhile, the transmission mechanism with input shaft 5 may also be a belt-drive continuously variable transmission, stepwise automatic transmission or the like.

Figure 2:
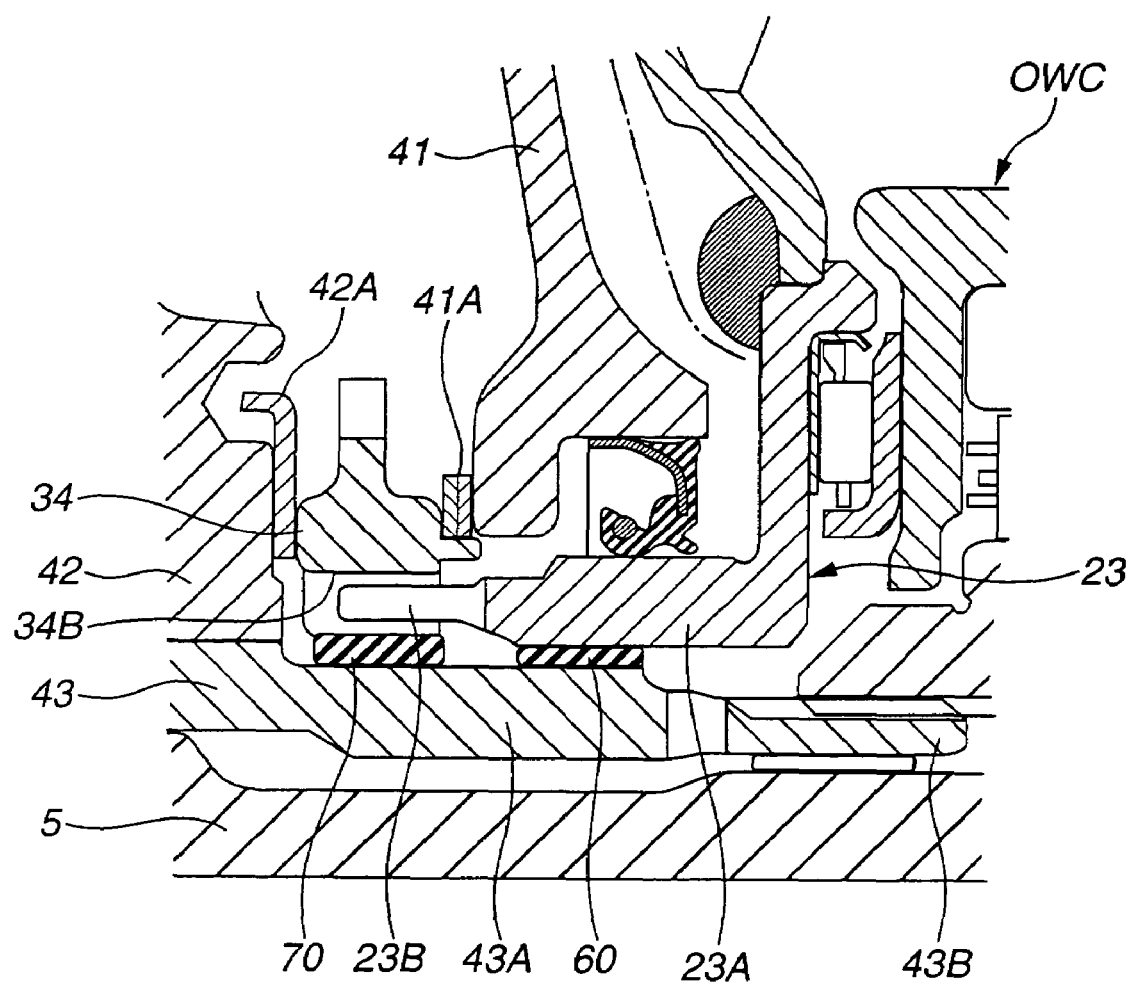
FIG. 2 is an enlarged diagram of the oil pump driving apparatus shown in FIG. 1, showing a torque converter sleeve and a sprocket of the oil pump driving apparatus.

FIG. 2 illustrates an enlarged section of the oil pump driving apparatus of the embodiment. As illustrated in FIG. 2, torque converter sleeve 23 includes axial extending sleeve portion 23A and drive projection 23B continuously axially extending from sleeve portion 23A toward cover 42. Sleeve portion 23A is disposed on a radial outside of input shaft 5 and has a radially extending flange welded to the radial-inner periphery of impeller shell 22. Stator shaft 43 is disposed between sleeve portion 23A and input shaft 5. Bearing 60 is disposed between an inner circumferential periphery of sleeve portion 23A and an outer circumferential periphery of stator shaft 43. Bearing 60 supports torque converter sleeve 23 so as to be rotatable relative to stator shaft 43. Bearing 60 is in the form of a bushing press-fitted to the inner circumferential periphery of sleeve portion 23A of torque converter sleeve 23. Sprocket 34 includes recessed portion 34B radially outwardly recessed from an inner circumferential surface of sprocket 34. Bearing 70 is disposed between an inner circumferential periphery of sprocket 34 and the outer circumferential periphery of stator shaft 43, and axially spaced from bearing 60. Bearing 70 supports sprocket 34 so as to be rotatable relative to stator shaft 43. Bearing 70 is in the form of a bushing press-fitted to the inner circumferential periphery of sprocket 34. Disc spring 41A is disposed between one of the axial end faces of sprocket 34 and torque converter housing 41. Thrust bearing 42A is disposed between the other of the axial end faces of sprocket 34 and cover 42. With the arrangement of disc spring 41A and thrust bearing 42A, sprocket 34 is held in place in the axial direction thereof.

Recessed portion 34B of sprocket 34 axially extends to be open to at least an axial end face of sprocket 34 which is located on a side of torque converter 2, namely, opposed to torque converter housing 41. In this embodiment, recessed portion 34B axially extends through the inner periphery of sprocket 34 to be open to both the opposed axial end faces of sprocket 34. Sprocket drive projection 23B of torque converter sleeve 23 is inserted into recessed portion 34B through an end opening on the axial end face opposed to torque converter housing 41, and received in recessed portion 34B with a clearance therebetween. The clearance includes a radially outside clearance defined between a bottom surface of recessed portion 34B and a radial-outer surface of sprocket drive projection 23B, and a radially inside clearance defined between a radial-inner surface of sprocket drive projection 23B and an outer circumferential surface of bearing 70. In the engagement state as shown in FIG. 2, at least a part of sprocket drive projection 23B radially overlaps with recessed portion 34B and bearing 70.

Specifically, sprocket drive projection 23B of torque converter sleeve 23 is designed to be smaller in size than recessed portion 34B of sprocket 34 by a predetermined value such that sprocket drive projections 23B can be prevented from interfering with recessed portion 34B upon occurrence of vibration of torque converter sleeve 23. As shown in FIG. 2, sprocket drive projection 23B has a radial thickness smaller than a radial width of recessed portion 34B. With this arrangement, even when sprocket drive projections 23B is vibrated in a direction offset from a rotation axis of torque converter sleeve 23 during the rotation of torque converter sleeve 23, the vibration of sprocket drive projections 23B can be prevented from being transmitted to sprocket 34. Therefore, the rotation of torque converter sleeve 23 can be transmitted to sprocket 34 without suffering from influence of interference between sprocket drive projections 23B and recessed portion 34B.

Figure 3:
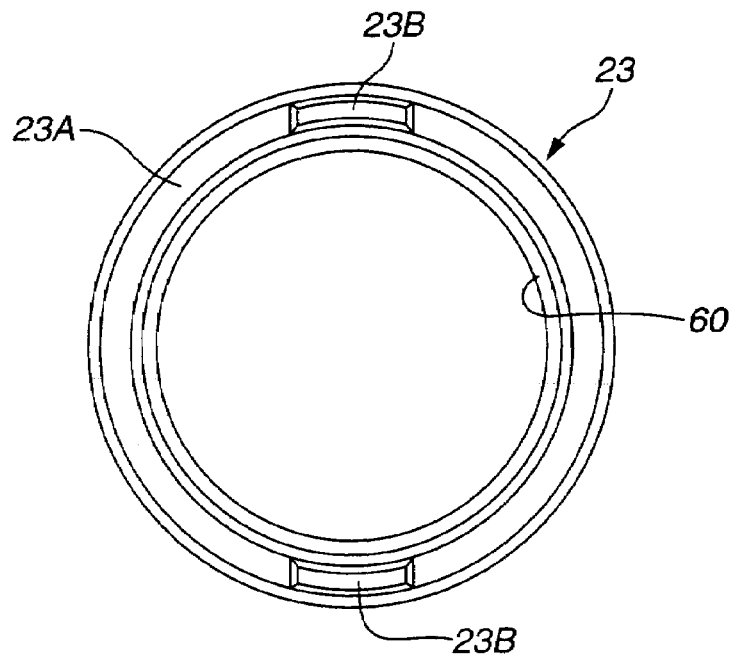
FIG. 3 is a front view of the torque converter sleeve as viewed in the axial direction from a side of a transmission mechanism of the automatic transmission.

Referring to FIG. 3, the arrangement of sprocket drive projection 23B of torque converter sleeve 23 and bearing 60 in this embodiment now is explained. As illustrated in FIG. 3, two sprocket drive projections 23B are arranged on sleeve portion 23A in a diametrically opposed relation to each other. Sprocket drive projections 23B are disposed on upper and lower sides of sleeve portion 23A as viewed in FIG. 3. Bearing 60 is disposed along the inner circumferential periphery of sleeve portion 23A.

Figure 4:
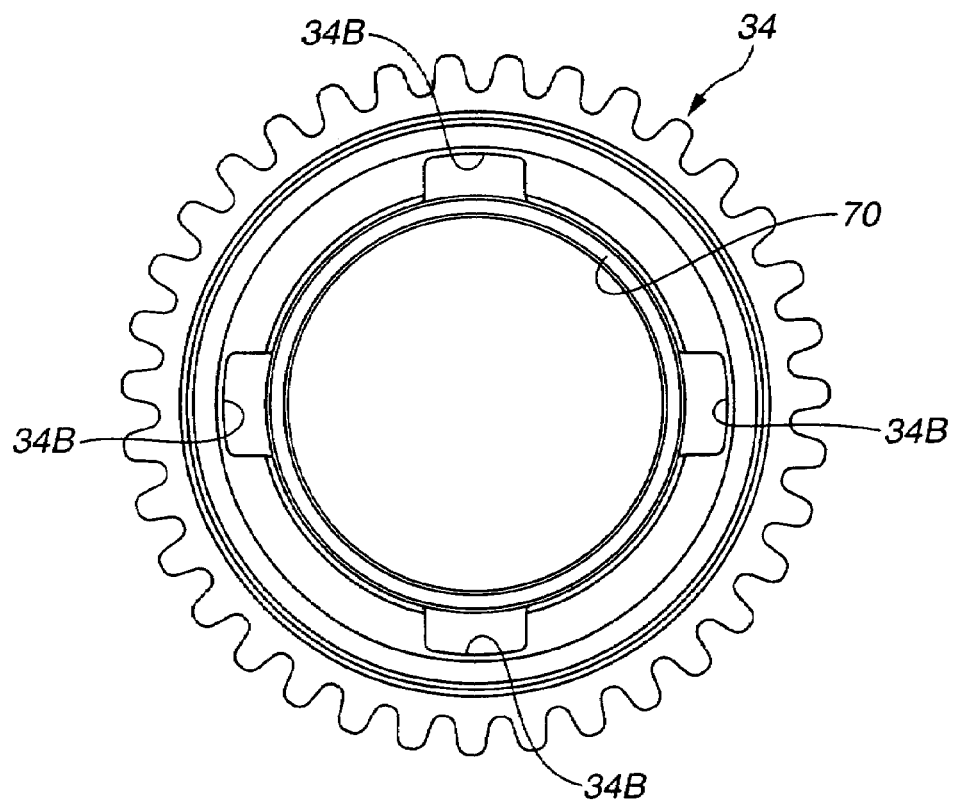
FIG. 4 is a front view of the sprocket as viewed in the axial direction from a side of an engine.

Referring to FIG. 4, the arrangement of recessed portion 34B of sprocket 34 and bearing 70 in this embodiment now is explained. As illustrated in FIG. 4, four recessed portions 34B are arranged on an inner circumferential periphery of sprocket 34 in a circumferentially spaced relation to each other. Recessed portions 34B can be circumferentially substantially equidistantly spaced from each other, namely, on upper, lower, left and right portions of the inner circumferential periphery of sprocket 34 as viewed in FIG. 4. Bearing 70 is disposed along the inner circumferential periphery of sprocket 34.

With the arrangement of four recessed portions 34B of sprocket 34 relative to two sprocket drive projections 23B of torque converter sleeve 23, positioning of sprocket 34 relative to torque converter sleeve 23 can be facilitated upon assembling thereof. Alternatively, only two recessed portions 34B may be formed corresponding to two drive projections 23B. Further, four sprocket drive projections 23B may be formed corresponding to four recessed portions 34B.

The oil driving apparatus of the embodiment of the present invention performs the following functions and effects. First, bearing 60 supports torque converter sleeve 23 so as to be rotatable relative to stator shaft 43, and bearing 70 supports sprocket 34 so as to be rotatable relative to stator shaft 43. Thus, torque converter sleeve 23 and sprocket 34 can be independently supported on stator shaft 43 by two bearings 60 and 70 axially spaced from each other. Stator shaft 43 has a sufficient strength. Even when vibration is input from engine 1 to torque converter sleeve 23, the vibration can be prevented from being transmitted from torque converter sleeve 23 to sprocket 34. This can suppress occurrence of abrasion and noise at the mutually engaged portions of torque converter sleeve 23 and sprocket 34, serving for improving the durability of the oil pump driving apparatus. Further, since the transmission of vibration input from the side of engine 1 is thus suppressed, the engaging portion of torque converter sleeve 23 with sprocket 34 may not necessitate a considerably large strength. This causes no increase in thickness of the engaging portion of torque converter sleeve 23, serving for reducing the production cost of torque converter sleeve 23.

Further, even when a driving load from oil pump 3 is applied to sprocket 34, sprocket 34 can be supported only by bearing 70 disposed on the inner circumferential periphery of sprocket 34. This can reduce the load applied to bearing 60 by about 30% as compared to the conventional apparatus employing a single bearing between the stator shaft, and the torque converter sleeve and the sprocket. Therefore, an axial length of bearing 60 can be reduced. As a result, an axial length of the whole transmission unit can also be reduced.

Further, sprocket drive projection 23B of torque converter sleeve 23 is engaged in recessed portion 34B of sprocket 34 with the clearance including the radially inside clearance between the radial-inner surface of sprocket drive projection 23B and the outer circumferential surface of bearing 70 and the radially outside clearance between the radial-outer surface of sprocket drive projection 23B and the bottom surface of recessed portion 34B. With this arrangement, the rotating force input from engine 1 can be transmitted to sprocket 34 without transmitting undesirable vibration and noise thereto. Furthermore, the transmission of the rotating force can be achieved with the simplified arrangement as compared to a splined connection as conventionally used. This serves for reducing the production cost.

Further, sprocket drive projection 23B of torque converter sleeve 23 is smaller in size than that of recessed portion 34B of sprocket 34 by the predetermined value such that sprocket drive projection 23B can be prevented from interfering with recessed portion 34B upon occurrence of vibration thereof. The thickness of sprocket drive projection 23B is smaller than the radial width of recessed portion 34B of sprocket 34 as shown in FIG. 2. This can suppress transmission of the vibration of sprocket drive projection 23B to sprocket 34 even if sprocket drive projection 23B is vibrated.

Further, since recessed portion 34B of sprocket 34 axially extends to be open to the at least an axial end face of sprocket 34, sprocket drive projections 23B of torque converter sleeve 23 is received in recessed portion 34B through the end opening. With this arrangement, at least a part of sprocket drive projections 23B of torque converter sleeve 23 radially overlaps with recessed portion 34B and bearing 70. This can avoid increase in axial length of torque converter sleeve 23 and axial length of the whole transmission unit.

This application is based on prior Japanese Patent Application No. 2004-146827 filed on May 17, 2004. The entire contents of the Japanese Patent Application No. 2004-146827 is hereby incorporated by reference.

Although the invention has been described above by reference to a certain embodiment of the invention, the invention is not limited to the embodiment described above. Modifications and variations of the embodiment described above will occur to those skilled in the art in light of the above teachings. The scope of the invention is defined with reference to the following claims.

What is claimed is:

1. An apparatus for driving an oil pump connected with a torque converter, the apparatus comprising:
   a rotation shaft in driving connection with the torque converter;
   a drive sprocket rotatable about the rotation shaft and adapted to be connected with a driven sprocket disposed on the oil pump via a chain;
   a first sleeve disposed on a radial outside of the rotation shaft so as to be rotatable together with the torque converter, the first sleeve being engaged with the drive sprocket;
   a second sleeve fixedly disposed on a radial inside of the first sleeve;
   a first bearing supporting the first sleeve so as to be rotatable relative to the second sleeve; and
   a second bearing supporting the drive sprocket so as to be rotatable relative to the second sleeve.

2. The apparatus as claimed in claim 1, wherein the first bearing and the second bearing are axially spaced from each other.

3. The apparatus as claimed in claim 1, wherein the first bearing is in the form of a bushing press-fitted to an inner circumferential periphery of the first sleeve, and the second bearing is in the form of a bushing press-fitted to an inner circumferential periphery of the drive sprocket.

4. The apparatus as claimed in claim 1, wherein the first sleeve is a torque converter sleeve rotatable together with a converter cover of the torque converter, the second sleeve being a stator shaft fixed to a transmission unit housing that accommodates the torque converter.

5. The apparatus as claimed in claim 1, wherein the rotation shaft is an input shaft of an automatic transmission, the input shaft being radially spaced from the oil pump.

6. The apparatus as claimed in claim 1, wherein the drive sprocket comprises a recessed portion radially outwardly recessed from an inner circumferential surface of the drive sprocket and axially extending to be open to at least an axial end face of the drive sprocket which is disposed on a side of the torque converter, the first sleeve comprising a sprocket drive projection axially extending to be engaged in the recessed portion such that at least a part of the sprocket drive projection radially overlaps with the recessed portion.

7. The apparatus as claimed in claim 6, wherein the sprocket drive projection of the first sleeve is engaged in the recessed portion such that the at least a part of the sprocket drive projection radially overlaps with the second bearing.

8. The apparatus as claimed in claim 6, wherein the recessed portion of the drive sprocket axially extends to be open to an opposite axial end face of the drive sprocket.

9. The apparatus as claimed in claim 6, wherein the sprocket drive projection of the first sleeve is received in the recessed portion of the drive sprocket with a clearance.

10. The apparatus as claimed in claim 9, wherein the clearance comprises a radially inside clearance defined between a radial-inner surface of the sprocket drive projection of the first sleeve and an outer circumferential surface of the second bearing, and a radially outside clearance defined between a radial-outer surface of the sprocket drive projection of the first sleeve and a bottom surface of the recessed portion of the drive sprocket.

* * * * *